UNITED STATES PATENT OFFICE.

WEBSTER E. BYRON BAKER AND HARRY WEAVER, OF YORK HAVEN, PENNSYLVANIA.

FUSIBLE ODORLESS RESINOUS COMPOSITION AND PROCESS OF MAKING SAME.

1,373,044. Specification of Letters Patent. Patented Mar. 29, 1921.

No Drawing. Application filed April 23, 1920. Serial No. 376,076.

*To all whom it may concern:*

Be it known that we, WEBSTER E. BYRON BAKER and HARRY WEAVER, citizens of the United States, residing at York Haven, in the county of York and State of Pennsylvania, have jointly invented a new and useful Fusible Odorless Resinous Composition and Process of Making Same, of which the following is a specification.

This application is a continuation in part of our application, Serial No. 318,187 of August 18th, 1919.

Our invention refers to fusible compositions of resinous and mineral materials, which we found useful in various applications, such as the making of molded objects and moldable paper materials, for example, containers for liquid, semi-liquid and solid foods and similar preparations, and caps, seals and closures for various types of bottles and containers, and our invention also refers to the rosin retaining substantially all of its natural physical and chemical properties but deprived of its odor producing ingredients.

The principal object of our invention is to provide a compound of resinous and mineral matter which possesses the following characteristics, viz.: (a) its initial softening point shall be in the vicinity of, or above 100° centigrade, and its fusion point somewhat higher, so that during its manufacture and application to the intended purpose it exists in a sterilized condition; (b) its viscosity and surface tension in its fused form shall be such that it will not exhibit a tendency to penetrate and permeate a given sheet of paper to a greater extent than is desirable for good cementing action; (c) its odor, due to the resinous constituents, shall be eliminated to the highest possible degree; (d) its rigidity shall be such that when used as a cement between several sheets of paper the resultant compound sheet shall be sufficiently rigid to present a satisfactory degree of resistance to the shocks and blows it may receive after being formed into containers, seals, etc., and while serving its purpose in this form as a package or closure for such substances as food products, etc., while they are in transit from one point to another, subjected to various conditions of packing and refrigeration, and (e) its color shall be white, or nearly colorless, when applied as a coating in a thin film, so as to not discolor any sheet of paper of any tint in an objectionable manner; and it shall be non-porous, or as nearly so as possible, inasmuch as this will in this manner serve as the greatest protection to the contents in case of any tendency to decomposition; and it shall be waterproof as this is a further measure of protection against exposure to the elements and handling as well as against tendency toward spoiling of such substances as food occasioned by the loss or gain of water, and the solubility of container ingredients; another object of our invention is to provide resin devoid of odor but possessed of all its beneficial properties and qualities.

We have found that a compound having the above characteristics and fulfilling the above requirements can be made in the following manner: Some clean grade of commercial rosin is selected and crushed in the usual manner, so as to facilitate the rapid fusion of same. It may here be stated that we do not limit ourselves to any particular grade of rosin, but prefer to employ the grade known to the trade as water white. After crushing, the rosin is fed into a fusion pan equipped with a suitable source of heat, electric, oil or steam, and the heat is regulated to maintain the mass of rosin somewhat above its fusion point. Care must be exercised to limit the degree of heat below the temperature at which the major constituents of the rosin would be affected, or odor producing compounds formed. In other words, the rosin is not heated hot enough to convert it into varnish, lacquer or the like. Turpentine residues are rather rapidly driven off. After this takes place and the rosin is still quite liquid, a small amount of some oxidizing compound is added, which causes a very peculiar reaction to take place, resulting generally in a slight tendency toward ebullition, and effecting a destructive change upon the rosin odor. An oxidizing compound is one adapted to liberate nascent oxygen. The character of the reaction may be described as follows: The odor of rosin seems to be due to the presence of a small proportion of a complex aldehyde which is present in the rosin. By continued heating without the addition of an oxidizing compound substantially at the melting point of the rosin this aldehyde-like substance either is not eliminated, or is replaced by more of the aldehyde, by a tautomeric change in all probability. By heating at higher temperatures without adding an oxidizing compound, decomposition of the rosin takes place resulting in the formation of other compounds possessing aromas. By destroying the aldehyde by conversion into other compounds, for example, carboxylic acids, or into additive compounds, through the addition of an oxidizing compound, the odor is destroyed, and is not regenerated at the fusion point of the rosin, nor are the properties of the major constituents of the rosin affected. We do not limit our invention to any particular oxidizing compound, but have been successful with the bisulfites and hypochlorites and chlorates of the alkalies and alkaline earth metals. For example, in the case of sodium bi-sulfite the reaction has been found to progress favorably. The bisulfite is gradually reduced to a peculiar "sulfid" compound, which does not, however, yield so distinct or so persistent an odor as does rosin. Furthermore, gradually this odor disappears during the subsequent processes, and the ultimate result is the deodorization of the rosin. In the case of hypochlorites and chlorates the nature of the oxidizing reaction is quite similar so far as the destruction of the odor is concerned, although due to the difference of reagents, different by-products of the reaction are formed. It is unnecessary to remove the by-products in either case. We do not limit ourselves to any set amount of oxidizing compound, in as much as different lots of the same grade of rosin will be found to require varying amounts of the same kind of deodorizing agent. We have found it desirable to avoid an excess of the deodorizing agent, because the use of an excess tends toward the undue decomposition of the rosin, which may result in the production of a secondary objectionable odor or affect or change the major constituents of the rosin. The hot liquid rosin may be filtered prior to the addition of the mineral filler and subsequent to the treatment with the deodorizing agent. Filtration, of course, is not necessary in case the rosin is sufficiently clean, as well as the deodorizing agent, but in operations on a large scale and the manufacture of a perfect product for the trade, it will facilitate the coating process and overcome such difficulties as might be encountered in putting a thin smooth coating of the substance on paper without first separating large particles of the usual dirt found in commercial rosin, particularly if the lower grades should be used instead of water white grade. We do not wish to limit ourselves to any particular type of filter, but on a large scale a very fine wire sieve will be found satisfactory, using same as an ordinary gravity filter. The wire, however, should not be of iron, as this would tend toward discoloration of the compound during the filtration process. Monel metal filter cloth will be satisfactory.

After the deodorizing agent has been added and the product filtered, in cases where filtering is desirable or necessary, we add the required amount of mineral filler, which may be any insoluble compound of the alkaline earths, and in some instances, of aluminum. Good success has been attained with that particular type of calcium sulfate known as "terra alba". In each case, however, we have found it preferable to dehydrate the mineral filler before adding it, and to employ a product free from iron and metals foreign to the above named groups, as the presence of both these impurities tends toward a darkening of the compound. The amount of the filler may be varied according to the characteristics of paper and the rosin, so as to obtain the most desirable viscosity in the heated mass, and the proper degree of rigidity, color, and impermeability in the resulting compound when it is applied to its various uses.

While we do not limit ourselves to the following proportions, these are found to answer the purpose for several grades of paper we have employed in coating:

Rosin 32 ounces.
Sodium bisulfite ¼ ounce.
Dehydrated terra alba 32 ounces.

It is understood that we do not limit the application of these compounds to the coating of paper, as they are useful for numerous other molding and coating processes and products.

We believe that odorless rosin possessed of its natural physical and chemical properties but devoid of its odor producing constituents is a new product, and in obtaining that product it is important to limit both the temperature and quantity of oxidizing compound in order to avoid changing the natural physical and chemical properties of the rosin and in order to avoid the formation of odor producing compounds, again the character of the oxidizing compound employed as a deodorizer is important, and it should be a compound adapted to liberate nascent oxygen, for example, we have had no success with the use of air and too high a heat produces varnish and like compounds.

No distinction is made between resin and rosin as the invention includes the substances which may be variously designated by either word.

We claim:

1. A fusible odorless resinous composition being the result of the reaction of fused resin and an oxidizing compound adapted to liberate nascent oxygen and sufficient to destroy the odor producing constituent originally present in the resin and insufficient to substantially affect the properties of the major constituents of the resin.

2. A fusible odorless resinous composition being the result of the reaction of fused rosin and sodium bisulfite.

3. A fusible odorless resinous composition consisting of the result of the reaction of fused resin at a temperature insufficient to form odor producing compounds, and nascent oxygen.

4. A fusible odorless resinous composition consisting of the result of the reaction of fused resin at a temperature insufficient to form odor producing compounds, and an oxidizing compound, and a filler.

5. A fusible odorless resinous composition consisting of the result of the reaction of fused resin at a temperature insufficient to form odor producing compounds, and an oxidizing compound, and terra alba.

6. A fusible odorless resinous composition consisting of an admixture of "terra alba" and the result of the reaction of fused rosin and sodium bisulfite.

7. A fusible odorless resinous composition consisting of an admixture of dehydrated "terra alba" and the result of the reaction of fused rosin and sodium bisulfite.

8. A fusible odorless resinous composition consisting of the result of the reaction of fused resin at a temperature insufficient to form odor producing compounds, and an oxidizing compound, and dehydrated terra alba.

9. The process of making a fusible odorless resinous composition which consists in fusing rosin and adding sodium bisulfite to the liquid rosin, substantially as described.

10. A fusible odorless resinous composition consisting of the result of the reaction of fused resin at a temperature insufficient to form odor producing compounds, and an oxidizing agent adapted to give off nascent oxygen and sufficient to destroy the odor producing constituents originally present in the resin and insufficient to substantially affect the properties of the major constituents of the resin.

11. A fusible odorless resinous composition consisting of the result of the reaction of fused resin at a temperature insufficient to form odor producing compounds, and an oxidizing agent adapted to give off nascent oxygen and sufficient to destroy the odor producing constituents originally present in the resin and insufficient to substantially affect the properties of the major constituents of the resin, and a filler.

12. A fusible odorless resinous composition consisting of the result of the reaction of fused resin at a temperature insufficient to form odor producing compounds, and an oxidizing agent adapted to give off nascent oxygen and sufficient to destroy the odor producing constituents originally present in the resin and insufficient to substantially affect the properties of the major constituents of the resin, and terra alba.

13. A fusible odorless resinous composition consisting of the result of the reaction of fused resin at a temperature insufficient to form odor producing compounds, and an oxidizing agent adapted to give off nascent oxygen and sufficient to destroy the odor producing constituents originally present in the resin and insufficient to substantially affect the properties of the major constituents, and dehydrated terra alba.

14. The process of making a fusible odorless resinous composition which consists in oxidizing the odor producing ingredients in the resin and avoiding the formation of odor producing compound by fusing the resin and limiting its temperature to substantially the point of fusion at which odor producing compounds are not formed, and adding an oxidizing agent capable of giving off nascent oxygen in quantity sufficient to destroy the odor producing ingredients originally in the resin and insufficient to affect the properties of its major constituents.

15. A resinous compound containing substantially all of the ingredients of the original resin in unaltered state, retaining substantially all the physical and chemical properties of the resin from which it is derived, and devoid of odor producing ingredients, substantially as described.

WEBSTER E. BYRON BAKER.
HARRY WEAVER.